H. G. BALDWIN.
ELASTIC WHEEL.
APPLICATION FILED APR. 4, 1910.
980,738.
Patented Jan. 3, 1911.
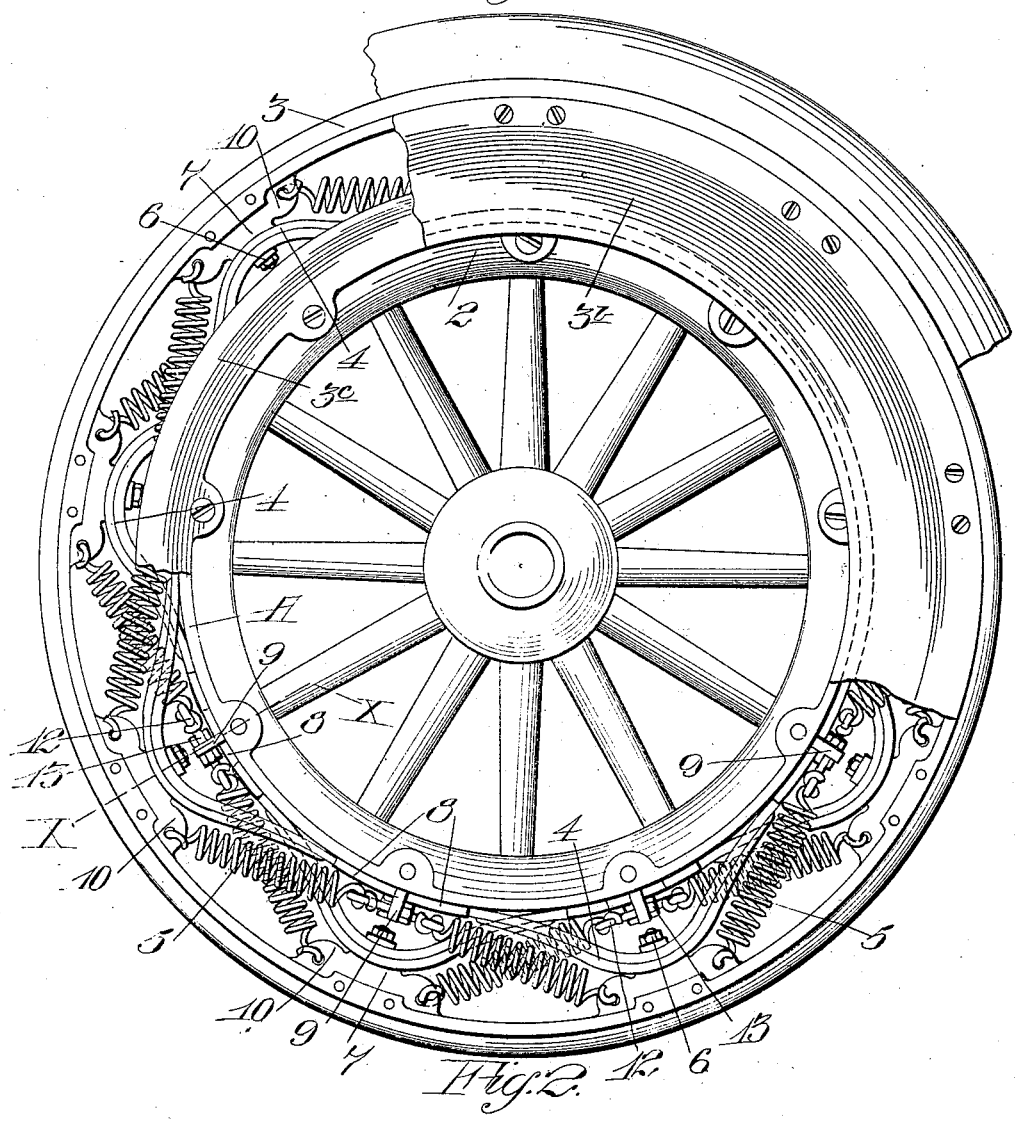
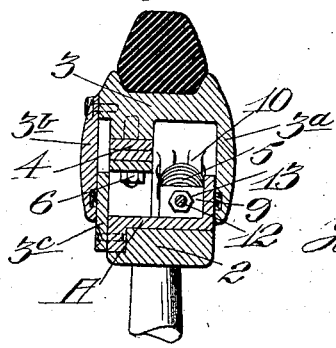
Witnesses
Thos. Castberg
F. E. Maynard
Inventor
Henry G. Baldwin
by G. H. Strong,
his Atty.

UNITED STATES PATENT OFFICE.

HENRY G. BALDWIN, OF SAN FRANCISCO, CALIFORNIA.

ELASTIC WHEEL.

980,738.

Specification of Letters Patent.

Patented Jan. 3, 1911.

Application filed April 4, 1910. Serial No. 553,168.

*To all whom it may concern:*

Be it known that I, HENRY G. BALDWIN, a citizen of the United States, residing in the city and county of San Francisco and State of California, have invented new and useful Improvements in Elastic Wheels, of which the following is a specification.

My invention relates to improvements in that class of wheels in which an elastic mechanism is inserted between the inner wheel proper and the exterior rim.

It consists in a novel combination of leaf and spiral springs, and in such arrangement of said springs as will provide for a yielding relative movement of the parts with relation to each other, and in every direction, and from every point in which the tension or pressure may be brought upon these intermediate parts.

It also comprises details of construction which will be more fully explained by reference to the accompanying drawings, in which—

Figure 1 is a side elevation, partly broken away. Fig. 2 is a cross section on line x—x of Fig. 1.

Fig. 1 represents the central portion of an ordinary wheel having spokes and exterior felly and rim 2, and 3 is a second rim adapted to carry a tire of any description; said second rim being located at a sufficient distance outside of the part A to accommodate the intermediate elastic members. These members consist of arched leaf springs 4, in conjunction with diagonal or tangentially disposed spiral springs 5 all under sufficient tension, so that in combination they will bear the load, and provide for an equable tension of all parts of the periphery of the wheel, whatever may be the constantly changing position of these parts.

The springs 4 have their central portion secured by bolts or clips, as at 6, to saddles 7 carried on the exterior periphery of the exterior rim 3. These springs are arched so that the ends press upon the rim of the inner wheel, and these ends are slidable in shoes 8 which are secured to the periphery of the inner rim, and these shoes and saddles are alternated so that each alternate spring 4 is at one side of the chamber formed between the two rims, and the other overlapping spring is at the other side, these springs overlapping so that the center of one spring and the end of the overlapping spring are substantially radial to the center of the wheel.

9 are radial lugs fixed in conjunction with the shoes 8, or to the sides of the chamber between the rims; these lugs also alternating in the same manner that the springs 4 alternate, and contiguous to or formed with the saddle 7 on the outer rim, are lugs 10.

The springs 5 are spiral, of sufficient stiffness, and have their outer ends attached to the lugs 10, and the inner ends are so formed as to be connected with the lugs 9 on the inner rims. This connection may readily be made by means of bolts as at 12, each bolt being connected with the contiguous end of the spiral spring 5 either by a head or button separably connected with the spring, or by other suitable means. The other end of this bolt extends through the lug 9, and by means of nuts as at 13 upon opposite sides of the lugs 9, these springs may be extended so as to have any desired tension.

The outer rim 3 is here shown as having an inwardly projecting flange $3^a$ which extends so as to be slidably movable over the inner rim 2, and form a joint therewith, and upon the opposite side are movable plates $3^b$—$3^c$, which are bolted one to the exterior rim, and one to the interior rim, and in the same manner being slidable upon the inner rim. These two annular plates form a dust-tight inclosure for the interior chamber in which the springs are contained.

The number and disposition of the springs 4 and 5 is such that the springs 4 overlap each other as plainly shown, the ends being slidable in the shoes 8, and these springs are sufficiently compressed and extended when put in place, to provide a sufficient bearing for the load which will be imposed upon the wheel, while springs 5 each extending from a point centrally interior to the arch of the springs 4 to points contiguous to the arches of the adjacent springs 4, and the tension of these springs is such that in conjunction with the springs 4, they provide for the yielding of the wheel in every direction upon which strain is brought. Thus if the wheel is turned to a point where the outer rim rests upon the ground at a point midway between the saddles 7 of the springs 4, a certain amount of compression of both these springs will take place, and a corresponding extension of the ends within the shoes 8. This causes a corresponding extension of the corresponding spiral springs 5, which being already under a high tension will add to the effective power of the springs 4. These springs also serve to resist the torsional strain caused by the mechanical effort to drive the central portion of the wheel which the frictional contact of the outer rim with the ground resists; thus these springs being already under a certain amount of tension, a pull tending to twist the inner wheel within the outer rim will be resisted by these springs all the way around the wheel.

The outer casing or rim may be made of any suitable material such as cast aluminum, and the wearing surfaces may be protected by case-hardened shoes, and the high tension under which all the springs are placed, insures their being noiseless in action.

An essential feature of this invention is the placing of the springs 4 with the arched centers outwardly, and the ends slidable upon shoes on the inner rim, which allows the movement of the spring ends in a direction approximately tangential to the inner rims, which I have found to be superior to the use of these springs in a reverse position, with their outer ends in contact with, or attached to the concavity of the outer rims.

Having thus described my invention, what I claim and desire to secure by Letters Patent is—

1. The combination with a central wheel and its rim, of an outer rim or casing, two sets of arched leaf springs having their central portions secured to the interior of the outer rim, shoes upon the outer side of the inner rim within which the ends of the arched springs are slidable approximately tangentially to said rim, and spiral springs under tension extending from points on the outer rim contiguous to the centers of the leaf springs of one set to points on the inner rim contiguous to the centers of the leaf springs of the other set.

2. The combination with an inner wheel and its rim, of an outer rim having saddles secured to its inner periphery, arched leaf springs having the centers fixed to said saddles, shoes fixed to the outer periphery of the inner rim adapted to receive the ends of the leaf springs which are slidable tangentially to the inner rim, lugs fixed to the inner rim radially in line with the center of the leaf springs, other lugs upon the interior of the outer rim contiguous to the central portions of said springs and spiral springs under tension extending between each set of said lugs, and coacting with the leaf springs.

3. The combination with an inner wheel and its rim, of an outer rim forming an annular chamber therewith, said outer rim having saddles around its inner periphery, and said inner rim having shoes in its outer periphery, arched leaf springs having the centers fixed to the saddles of the outer rim, and the ends slidable tangentially in the shoes of the inner rim, spiral springs under tension, lugs on the inner rim substantially radial to the centers of the leaf springs, and lugs upon the outer rims contiguous to the centers of the leaf springs between which lugs spiral springs extend, and means for varying the tension of said springs.

4. The combination with a wheel and the peripheral felly and rim therefor, of an outer rim forming with the inner one an annular chamber, said outer rim adapted to carry a tire upon its periphery, and having an inwardly projecting integral flange overlapping the inner rim and forming one side of the chamber, and a similar removable flange forming the opposite side of the chamber, saddles located alternately at one side and the other of the outer rim, and shoes correspondingly located in line therewith upon the inner rim, arched leaf springs having their centers secured to the saddles of the outer rims, and their ends slidable tangentially in the shoes of the inner rims, correspondingly located lugs upon the inner and outer rim, and spiral springs under tension extending between said lugs and coacting with the leaf springs.

In testimony whereof I have hereunto set my hand in the presence of two subscribing witnesses.

HENRY G. BALDWIN.

Witnesses:
CHARLES A. PENFIELD,
CHARLES EDELMAN.